United States Patent
Smith

(10) Patent No.: US 7,360,785 B2
(45) Date of Patent: Apr. 22, 2008

(54) PIVOTAL HANDLE FOR A FOOD SERVICE TABLE

(75) Inventor: Kenneth R. Smith, Atlantic City, NJ (US)

(73) Assignee: Sico Incorporated, Edina, MN (US)

( * ) Notice: Subject to any disclaimer, the term of this patent is extended or adjusted under 35 U.S.C. 154(b) by 166 days.

(21) Appl. No.: 10/848,833

(22) Filed: May 17, 2004

(65) Prior Publication Data

US 2004/0262868 A1    Dec. 30, 2004

Related U.S. Application Data

(63) Continuation of application No. 09/950,535, filed on Sep. 13, 2001, now Pat. No. 6,802,525.

(51) Int. Cl.
*B62B 3/02* (2006.01)

(52) U.S. Cl. .................................. 280/659; 280/47.34

(58) Field of Classification Search ............ 280/47.34, 280/655, 655.1, 47.371, 651, 659, 47.315, 280/47.17, 47.26; 16/405, 408, 429; 108/67, 108/50.011, 50.16
See application file for complete search history.

(56) References Cited

U.S. PATENT DOCUMENTS

| | | | |
|---|---|---|---|
| 785,029 A * | 3/1905 | Vore ........................... | 280/47.3 |
| 1,455,395 A * | 5/1923 | Exum ......................... | 312/198 |
| 1,582,045 A | 4/1926 | Don Howe | |
| 1,828,248 A | 10/1931 | Hallowell et al. | |
| 2,043,797 A * | 6/1936 | Horn ........................... | 219/417 |
| 2,253,824 A * | 8/1941 | Townsend et al. .......... | 16/35 R |
| 2,571,442 A | 10/1951 | Griffith | |
| 2,603,500 A | 7/1952 | Messier | |
| 3,203,707 A | 8/1965 | Anderson | |
| 3,649,997 A | 3/1972 | Thorud | |
| 3,816,873 A | 6/1974 | Thorud et al. | |
| 3,920,259 A | 11/1975 | Graham | |
| 4,160,557 A | 7/1979 | Taylor | |
| 4,362,308 A | 12/1982 | Hicks et al. | |
| 4,581,902 A | 4/1986 | Starck et al. | |
| 4,724,681 A | 2/1988 | Bartholomew et al. | |
| 4,846,493 A | 7/1989 | Mason | |
| 4,856,810 A | 8/1989 | Smith | |

(Continued)

OTHER PUBLICATIONS

Sico Room Service Tables Brochure (admitted prior art).

*Primary Examiner*—Christopher P. Ellis
*Assistant Examiner*—Bridget Avery
(74) *Attorney, Agent, or Firm*—Merchant & Gould P.C.

(57) ABSTRACT

A pivotal handle for a food service table is disclosed. The handle includes two elongated, parallel curved bar members. Each member has an outwardly extending arm and an outwardly extending leg. The legs have means for pivotably attaching the handle to the underside of the table. In its operative position, the handle is pivoted upwardly so that the arms are located above the top of the table. Locking means such as a quick release pin is inserted into an opening formed in the leg which locks the handle in place. When the table is ready to be used as a dining table or to be stored, the pin is removed so that the handle may now be rotated downwardly and stored under the table. A spring clip may be attached to the underside of the table which secures the handle in place when the handle is in the stored position.

23 Claims, 3 Drawing Sheets

U.S. PATENT DOCUMENTS

| | | |
|---|---|---|
| 4,875,696 A | 10/1989 | Welch et al. |
| 5,299,826 A | 4/1994 | Flowers |
| 5,306,029 A * | 4/1994 | Kaiser, II .................... 280/30 |
| 5,562,300 A | 10/1996 | Nelson |
| 5,593,174 A | 1/1997 | Graziano et al. |
| 5,687,978 A | 11/1997 | Rhodes et al. |
| 5,692,761 A | 12/1997 | Havlovitz |
| 5,876,047 A | 3/1999 | Dennis |
| 6,010,145 A | 1/2000 | Liu |
| 6,354,611 B1 | 3/2002 | Mihalic et al. |

* cited by examiner

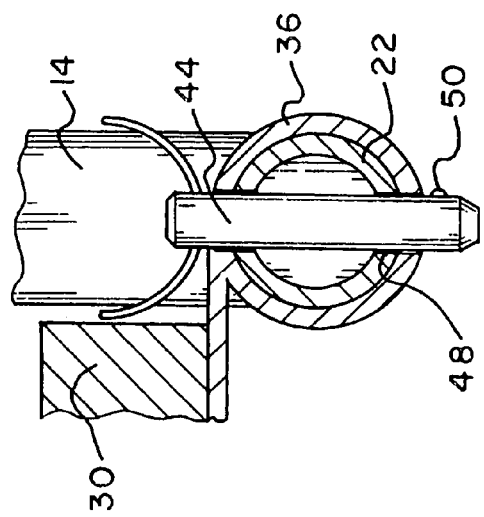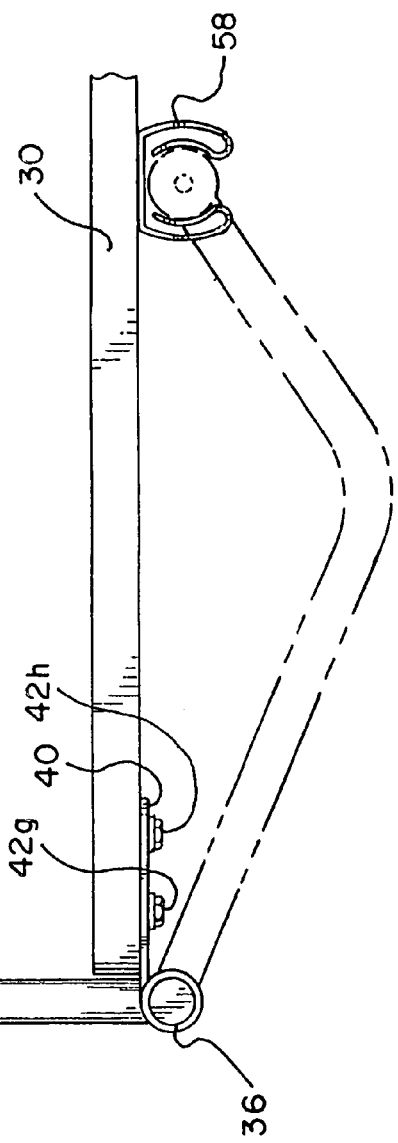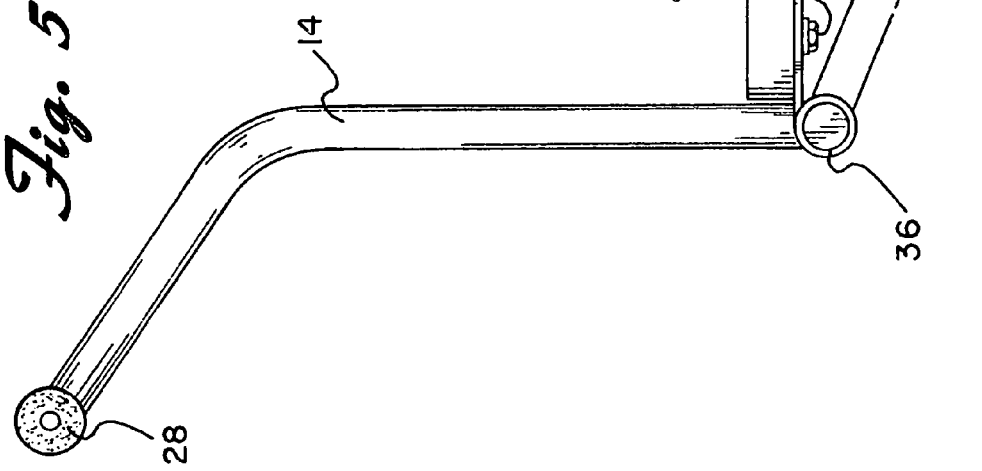

PIVOTAL HANDLE FOR A FOOD SERVICE TABLE

This application is a continuation of application Ser. No. 09/950,535, filed Sep. 13, 2001 now U.S. Pat. No. 6,802,525, which application(s) are incorporated herein by reference.

BACKGROUND OF THE INVENTION

The present invention is directed toward a handle and particularly, toward a handle for a wheeled food service table where the handle is pivotable between an operative and an inoperative position.

It is common practice in hotels, on cruise ships, and in other types of lodging where food is consumed by guests in a room separate from a dining room to serve food on a portable, wheeled table. The table serves not only as a mode of transportation for the food, but as a table upon which the food may be served and consumed.

Typically, these wheeled tables are equipped with at least one handle which is used by the server to push or pull the table. The handle, however, is often located at the same or close to the level of the top of the table. For example, U.S. Pat. No. 5,183,372 to Dinverno discloses a service cart where the handle is nearly level with the top of the cart. As a result, the server is forced to bend over in order to maneuver the table. This causes strain on the person's back and arms.

Also, as these tables are used as dining tables, it is not very aesthetically pleasing to have a handle protruding from one or more sides of the table.

Therefore, a need exists for a food service table with a handle which allows the server to maneuver the table in a comfortable and ergonomically correct manner. Also, a need exists for a functional yet aesthetically pleasing portable, wheeled table.

SUMMARY OF THE INVENTION

The present invention is designed to overcome the deficiencies of the prior art discussed above. It is an object of the present invention to provide a pivotal handle for a food service table which allows the table to be maneuvered easily and comfortably by a person.

It is another object of the present invention to provide a handle for a food service table which allows the table to be stored compactly.

It is a further object of the present invention to provide a pivotal handle for a food service table which allows the table to be aesthetically pleasing when the handle is not in use.

In accordance with the illustrative embodiments demonstrating features and advantages of the present invention, there is provided a pivotal handle for a food service table. The handle includes two elongated, parallel curved right and left bar members. Each member has an outwardly extending arm and an outwardly extending leg. The arm and leg of the right bar member extend outwardly to the right and the arm and leg of the left bar member extend outwardly to the left. Each of the arms has a gripping portion which a person using the handle grips in order to steer the table. The legs have means for pivotably attaching the handle to the underside of the table. In its operative position, the handle is pivoted upwardly so that the arms are located above the top of the table and are accessible. Locking means such as a quick release pin is inserted into an opening formed in the leg which locks the handle in place. When the table is ready to be used as a dining table or to be stored, the pin is removed so that the handle may now be rotated downwardly and stored under the table. Securing means may be attached to the underside of the table which secures the handle in place when the handle is in the stored position.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 5 is right side elevational view of the handle of the present invention; and FIG. 6 is a partial cross-sectional view taken through line 6-6 of FIG. 3.

DETAILED DESCRIPTION OF THE PREFERRED EMBODIMENT

Figure 2:
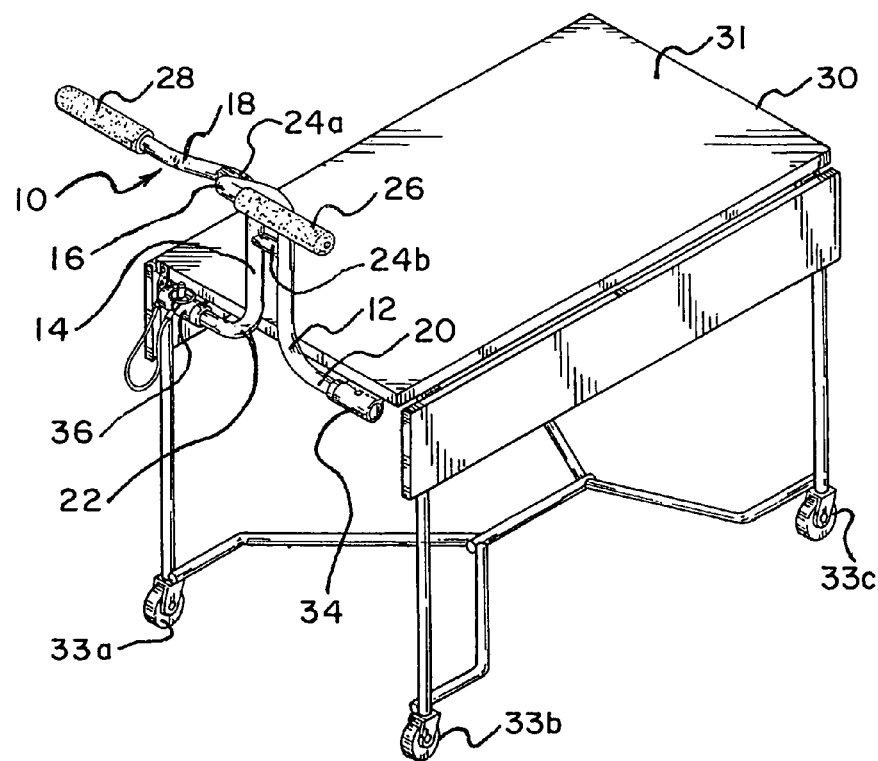
FIG. 2 is a front perspective view of the handle of the present invention attached to a food service table.

Referring now to the drawings in detail wherein like reference numerals have been used throughout the various figures to designate like elements, there is shown in FIG. 2 a pivotal handle constructed in accordance with the principles of the present invention and designated generally as 10.

The handle of the present invention includes two generally parallel elongated, curved right and left bar members 12 and 14, respectively. Each member 12 and 14 has an arm 16 and 18, respectively, which curves outwardly from the top of the bar member at a generally ninety degree angle. Arm 16 of right bar member 12 extends outwardly to the right and arm 18 of left bar member 14 extends outwardly to the left. Each member 12 and 14 also has a leg 20 and 22, respectively, which curves outwardly from the bottom of the bar member at a generally ninety degree angle. Leg 20 of right bar member 12 extends outwardly to the right and leg 22 of left bar member 14 extends outwardly to the left. The bar members 12 and 14 are connected or secured to each other via horizontal extensions 24a and 24b. Each of the arms 16 and 18 has a respective gripping portion 26 and 28 which a person using the handle grips in order to steer the table 30. The gripping portions may be made from foam, rubber, or similar material which allows a person to grasp the arms without losing his or her grip.

Each leg 20 and 22 has means for pivotably attaching the handle to the underside 32 of the table 30. The attaching means may include cylindrical sockets 34 and 36 though which legs 20 and 22, respectively, extend and plates 38 and 40 which are welded or otherwise permanently secured to their respective sockets 34 and 36. The plates 38 and 40 are secured to the underside 32 of the table 30 by bolting them, for example, to the underside 32 of the table 30 via bolts 42a-42h. Legs 20 and 22 fit securely within the sockets 34 and 36, respectively, yet may rotate therein as will be more fully described below.

Figure 3:
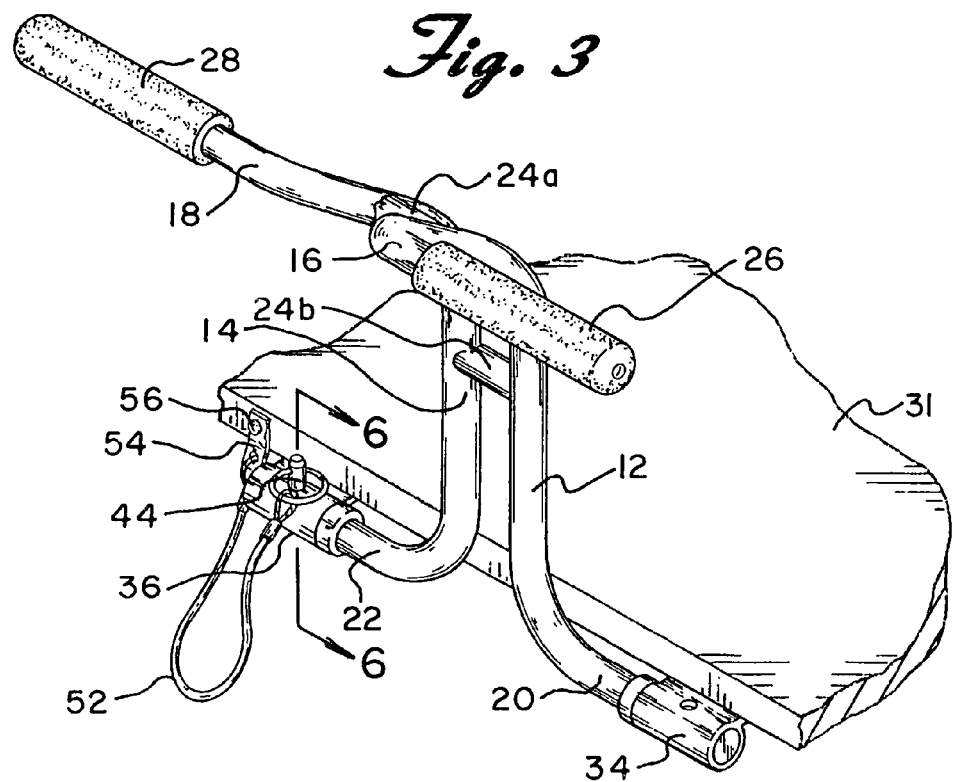
FIG. 3 illustrates the handle of the present invention in the operative position.
Figure 4:
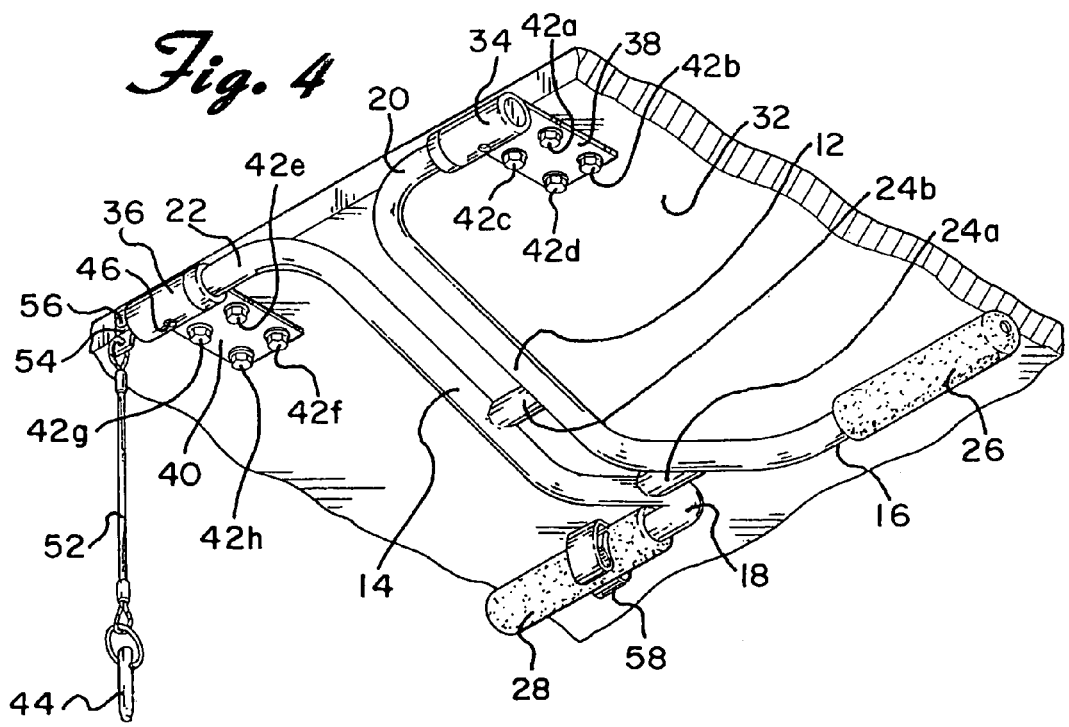
FIG. 4 illustrates the handle of the present invention in the inoperative position.

In its operative position, the handle is pivoted upwardly so that the arms 16 and 18 are located above the top surface 31 of the table 30 and are accessible. (See FIGS. 2 and 3.) Locking means such as quick release pins are inserted into respective openings formed in the sockets and legs. This is shown, for example, as pin 44, opening 46 in socket 36, and opening 48 in leg 22. (See FIGS. 4 and 6.) The pin 44 has a spring-loaded ball 50 which prevents the pin 44 from being withdrawn from the openings 46 and 48 unless significant force is being applied to the pin 44. (See FIG. 6.) Thus, the handle is prevented from moving. The pin 44 may include means for securing the same to the table 30. This is shown, for example, as a wire 52 attached to the pin 44 and to a plate 54 where the plate 54 is bolted to the table 30 via bolt 56. (See FIG. 3.) The server may now grasp the arms 16 and 18 and easily maneuver the table 30 which has a plurality of wheels 33a, 33b, and 33c attached to the underside 32 of the table 30 to the desired location without having to bend over.

Figure 1:
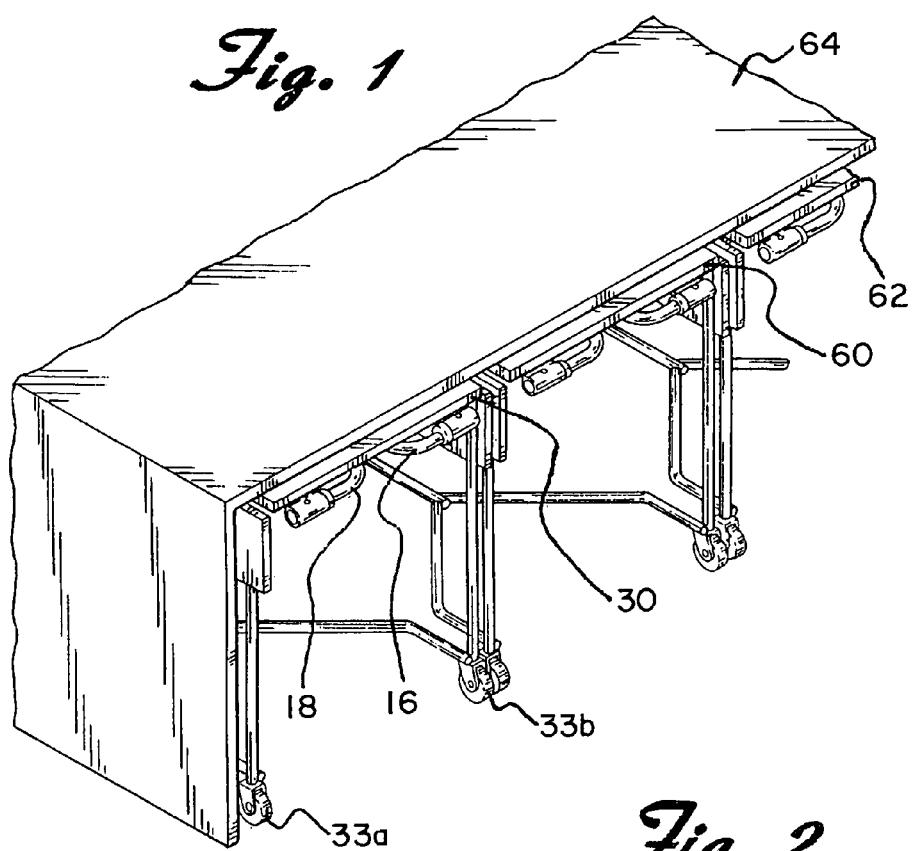
FIG. 1 illustrates a plurality of food service tables being stored where each table has a handle of the present invention attached thereto.

When the table 30 is ready to be used as a dining table or to be stored, the pin 44 is removed from the openings 46 and 48. The legs 20 and 22 are now free to rotate within the sockets 34 and 36, respectively. The handle is rotated downwardly and stored on the underside 32 of the table 30. (See FIG. 4.) Securing means may be attached to the underside 32 of the table 30 which secures the handle in place. (See FIGS. 4 and 5.) Securing means may be a spring clip 58 or the other securing means well known and used in the art. While the spring clip 58 is shown to be gripping arm 18, it should be realized that either arm may be secured. The table may now be used as a dining table without the interference of the upwardly extending handle. Alternatively, a plurality of tables 30, 60, and 62 with a handle attached to each may be stored compactly under a counter 64 or the like. (See FIG. 1.)

The present invention may be embodied in other specific forms without departing from the spirit or essential attributes thereof and accordingly, reference should be made to the appended claims rather than to the foregoing specification as indicating the scope of the invention.

I claim:

1. A room service table, comprising:
   a frame;
   a table top;
   wheels supporting the frame;
   a push handle movable between a use position and a storage position, wherein the handle is fixed and extends above and beyond the table top in the use position and wherein the handle is fixed and extends along an underside of the table top in the storage position.

2. A table according to claim 1, wherein the handle pivots between the use position and the storage position.

3. A table according to claim 1, wherein the handle is rigidly set at the use position and at the storage position.

4. A table according to claim 1, wherein the handle extends above the wheels at the use position and at the storage position.

5. A table according to claim 1, wherein the handle is movable between the use position and the storage position while the cart is supported on the wheels.

6. A table according to claim 1, wherein the handle includes a rigid grip portion and connecting portion, wherein the connecting portion pivotally mounts to an underside of the table top.

7. A table according to claim 1, wherein the table top comprises a center portion and side portions folding downward.

8. A table according to claim 1, further comprising a handle lock for locking the handle at the use position and at the storage position.

9. A table according to claim 1, wherein the handle includes a pivot axis and wherein the handle extends in a first direction away from and above the pivot axis at the use position and wherein the handle extends in a second generally horizontal direction away from the pivot axis at the storage position.

10. A table according to claim 1, wherein the handle comprises a grip portion, wherein the grip portion is proximate an underside of the table top in the storage position.

11. A handle according to claim 3, wherein the wherein the grip portion of the handle abuts the underside of the table at the storage position.

12. A room service table, comprising:
   a folding table top having a center portion and folding side portions;
   a frame supporting the center portion;
   wheels mounted to the frame;
   a handle pivotally mounted to an underside of the center portion, wherein the handle pivots between a first position with the handle rigidly fixed beneath and proximate the table top center portion, and a second position with handle rigidly fixed above the table top.

13. A room service table according to claim 12, wherein the handle extends horizontally beyond a periphery of the table top.

14. A room service table according to claim 12, wherein the handle comprises a push handle.

15. A handle for a room service table having a table top, a frame supporting the table top, and wheels mounted to the frame, the handle comprising:
   a pivot configured for mounting at an underside of the table;
   a grip portion configured for gripping while pushing by a user;
   a connecting portion attaching to the pivot and the grip portion;
   a first lock for rigidly fixing the handle at a use position wherein the handle extends above and beyond the table top; and
   a second lock for rigidly fixing the handle at a storage position wherein the handle extends substantially along an underside of the table top.

16. A handle according to claim 15, wherein the first lock and the second lock are releasable.

17. A room service table, comprising:
   a folding table top having a center portion and folding side portions;
   a frame supporting the center portion and including spaced part vertical frame members defining open ends;
   wheels mounted to the frame;
   a handle pivotally mounted to an underside of the center portion, wherein the handle pivots through a first one of the open ends between a use position with the handle rigidly fixed above the table top and a storage position with the handle rigidly fixed beneath and proximate the center portion.

18. A room service table according to claim 17, wherein the handle extends along an underside of the table top at the storage position.

19. A room service table according to claim 17, wherein the handle pivots more than 180 degrees between the use position and the storage position.

20. A roam service table according to claim 17, wherein the handle pivots to the storage position through a position beyond vertical.

21. A room service table according to claim 17, wherein the handle extends substantially horizontally at the storage position.

22. A room service table according to claim 18, wherein the handle pivots more than 180 degrees between the use position and the storage position.

23. A room service table according to claim 22, wherein the handle passes through a vertically extending position intermediate the use position and the storage position.

* * * * *